– – – –

United States Patent
Hummel

(10) Patent No.: US 6,883,323 B2
(45) Date of Patent: Apr. 26, 2005

(54) INTERNAL COMBUSTION ENGINE WITH SECONDARY AIR CHARGING AND A METHOD OF CONTROLLING THE SECONDARY AIR CHARGING SYSTEM

(75) Inventor: Karl-Ernst Hummel, Bietigheim-Bissingen (DE)

(73) Assignee: Mann & Hummel GmbH, Ludwigshafen (DE)

( * ) Notice: Subject to any disclaimer, the term of this patent is extended or adjusted under 35 U.S.C. 154(b) by 27 days.

(21) Appl. No.: 10/601,197

(22) Filed: Jun. 23, 2003

(65) Prior Publication Data

US 2004/0159312 A1 Aug. 19, 2004

Related U.S. Application Data

(63) Continuation of application No. PCT/EP01/12848, filed on Nov. 7, 2001.

(30) Foreign Application Priority Data

Dec. 22, 2000 (DE) .......................................... 100 64 481

(51) Int. Cl.$^7$ .......................... F02B 33/44; F02B 37/02; F01N 3/00
(52) U.S. Cl. ............................... 60/606; 60/290; 60/289
(58) Field of Search .......................... 60/606, 290, 289, 60/287, 397, 305; 123/559.1

(56) References Cited

U.S. PATENT DOCUMENTS 4,299,089 A * 11/1981 Takeda ........................ 60/290
4,674,283 A * 6/1987 Ishida et al. .................. 60/606
4,702,219 A * 10/1987 Tadokoro et al. ......... 123/559.1
5,095,691 A * 3/1992 Yoshimura .................... 60/289
5,560,199 A * 10/1996 Agustin et al. ............... 60/289
5,832,725 A * 11/1998 Sim ............................. 60/289
5,921,077 A 7/1999 Bayerle et al. ............... 60/287
6,094,909 A 8/2000 Weber et al.
6,192,678 B1 * 2/2001 Tachibana ..................... 60/289

FOREIGN PATENT DOCUMENTS

| DE | 40 20 891 A | 1/1993 | .................. 60/290 |
| EP | 0 659 986 A | 6/1995 | .................. 60/290 |
| EP | 0 800 618 B | 12/1999 | .................. 60/287 |
| JP | 6112720 A * | 5/1986 | .......... F02B/37/02 |
| JP | 61 093242 A | 5/1986 | ............. F01N/3/22 |
| WO | WO 97 38212 A | 10/1997 | .................. 60/289 |

* cited by examiner

Primary Examiner—Thai-Ba Trieu
(74) Attorney, Agent, or Firm—Crowell & Moring LLP

(57) ABSTRACT

A method and an apparatus for determining the performance of a secondary air charging system for an internal combustion engine in order to determine the amount of secondary air supplied in the secondary air charging system. This is achieved by measuring the heat generated by the compression of the secondary air with temperature sensors. Insofar as the secondary air charging system is powered by a turbine arranged in parallel with the throttle valve in the intake tract, the measured temperature value for the compressor can be compared with a reduction in temperature of the intake air behind the turbine. Reliable information concerning the amount of secondary air supplied can be determined by simple sensors, thereby obviating the need for an air-mass sensor which is expensive to produce and sensitive to contamination.

10 Claims, 3 Drawing Sheets

INTERNAL COMBUSTION ENGINE WITH SECONDARY AIR CHARGING AND A METHOD OF CONTROLLING THE SECONDARY AIR CHARGING SYSTEM

CROSS REFERENCE TO RELATED APPLICATIONS

This application is a continuation of international patent application no. PCT/EP01/12848, filed Nov. 7, 2001, designating the United States of America, and published in German as WO 02/052130, the entire disclosure of which is incorporated herein by reference. Priority is claimed based on Federal Republic of Germany patent application no. DE 100 64 481.3, filed Dec. 22, 2000.

BACKGROUND OF THE INVENTION

This invention relates to an internal combustion engine having a sensor-monitored secondary air charging system. This invention further relates to a method of measuring the operating condition of an internal combustion engine.

Devices of the type described above are known, for example, from Weber et al., U.S. Pat. No. 6,094,909 (=WO 97/38 212). According to FIG. 8 of that document, a secondary air injection system is proposed for an internal combustion engine, comprising a turbine unit 114 and a compressor 113. The turbine is driven via a bypass line arranged in parallel with the throttle valve 115 in the intake tract. In addition, at least one throttle member 120 is also situated in the bypass line to the turbine. Intake air flow and secondary air flow are adjusted simultaneously by the interaction of throttle valve 115 and throttle member 120. The output of the turbine 114 and thus also the secondary air delivered by the compressor 113 as well as the intake air flow delivered as the addition to the air streams can be adjusted through the throttle member 120 and the throttle valve 115. Instead of the regulated turbine, it is of course also possible for a different drive to be provided for the compressor, e.g., an electric motor.

For optimum adjustment of the two air streams, the complex processes involved in an internal combustion engine must be understood. The air demand prevailing in the intake tract of the internal combustion engine and/or in the exhaust system can be determined from this. The air demand by the internal combustion engine depends on the load condition, for example, but also on the type of operation desired, e.g., combustion of fuel in an oxygen excess or in a lack of oxygen. Secondary air is introduced into the exhaust gas system, e.g., in the cold start phase of the engine. The exhaust gas system should oxidize any incompletely burned constituents of the exhaust, and in addition the downstream catalytic converter in the exhaust system should be heated by this exothermic reaction. This decreases coldstart emissions and shortens the cold start phase, because due to this heating the catalytic converter begins to be effective sooner.

When the secondary air is introduced, a certain air ratio must be established in order for emission abatement to function properly. If there is too much secondary air, the exhaust is cooled too greatly without the additional exhaust components being oxidized. If there is too little secondary air, not enough oxygen is available for oxidation of the exhaust constituents. Therefore, the air flow rate through the secondary air charging system must be monitored.

According to Bayerle et al., U.S. Pat. No. 5,921,077 (=EP 800,611), a method is disclosed whereby the air flow rate delivered by the secondary air pump is determined by an air flow rate sensor, and the resulting value is used to control the secondary air pump. However, the use of air flow rate sensors has some significant disadvantages. First, these measurement devices are quite expensive, so that the economics of this proposed solution are adversely affected. In addition, they are highly sensitive to fouling, so the air flow rate values determined may be inaccurate. This has a direct effect on the desired exhaust gas result to be achieved with the internal combustion engine.

SUMMARY OF THE INVENTION

Accordingly, it is an object of the present invention to provide an improved monitoring device for a secondary air charging system of an internal combustion engine.

Another object of the invention is to provide a monitoring device for a secondary air charging system which is economical to manufacture and reliable in operation.

It is also an object of the invention to provide a new method of operating a monitoring device for a secondary air charging system of an internal combustion engine.

These and other objects are achieved in accordance with the present invention by providing an internal combustion engine having an intake tract for intake air and an exhaust system for combustion products of the internal combustion engine, and further comprising a secondary air charging system comprising a compressor powered by a drive, and a sensor for generating a measurement signal suitable for determining a delivery rate of secondary air delivered by the secondary air charging system, wherein said sensor is a temperature sensor which communicates with compressed air downstream from the compressor to measure the temperature of the compressed air.

In accordance with a further aspect of the invention, the objects are achieved by providing an internal combustion engine having an intake tract for intake air and an exhaust system for combustion products of the internal combustion engine, and further comprising a secondary air charging system comprising a compressor powered by a drive, and a sensor for generating a measurement signal suitable for determining a delivery rate of secondary air delivered by the secondary air charging system, wherein said drive comprises a turbine, which is arranged in parallel with a throttle valve in the intake tract, and said sensor is a temperature sensor which communicates with depressurized intake air downstream from the turbine to measure the temperature of the depressurized air.

In another aspect of the invention the objects are achieved by providing a method of monitoring secondary air injection into an exhaust system of an internal combustion engine, wherein a delivery rate of secondary air delivered through a secondary air charging system is monitored, said method comprising measuring heating of the secondary air which occurs due to compression, and using the measurement result is used as a measure of the delivery rate of the secondary air charging system.

In yet another aspect of the invention, the objects are achieved by providing a method of monitoring the secondary air injection into an exhaust system of an internal combustion engine, wherein a delivery rate of secondary air delivered by a secondary air charging system is monitored, and the secondary air charging system is driven by a turbine arranged in parallel with a throttle valve in an intake tract of the internal combustion engine, said method comprising measuring cooling of intake air which occurs due to expansion in the turbine, and using the measurement result as a measure of the delivery rate of the secondary air charging system.

In a still further aspect, the objects are achieved by providing a method of monitoring secondary air injection into an exhaust system of an internal combustion engine wherein a delivery rate of secondary air delivered by a secondary air charging system is monitored, and the secondary air charging system is driven by a turbine arranged in parallel with a throttle valve in an intake tract of the internal combustion engine, said method comprising measuring the temperature of intake air downstream from the turbine; measuring the temperature of secondary air downstream from the compressor; and using the measured temperature of intake air downstream from the turbine and the measured temperature of the secondary air downstream from the compressor as a measure of the delivery rate of the secondary air charging system.

The internal combustion engine according to this invention is equipped in a known manner with a secondary air charging system, which delivers secondary air directly into the exhaust system, thus achieving the advantages described above for operation of the catalytic converter, which is also provided in the exhaust system. In addition, a sensor which generates a measurement signal suitable for determining the secondary air delivery rate is provided.

The present invention is distinguished by the fact that this sensor comprises a temperature sensor which is situated in such a way that it communicates with the air downstream from the compressor, i.e., it can measure the temperature of this air. In this connection, it is advantageous to position the temperature sensor as close as possible downstream from the compressor outlet. For example, it may be mounted inside the connecting line between the secondary air charging system and the exhaust system, so that the secondary air can be added upstream from the catalytic converter.

For a specially designed secondary air charging system, which is in turn driven by a turbine which utilizes the pressure drop across a throttle valve present in the intake system, the temperature sensor may also be mounted at the turbine outlet, for example. The sensor here detects the temperature of the intake air depressurized by the turbine.

The measurement principle according to this invention makes use of the circumstance that an increase in temperature can be detected in the air compressed by the secondary air charging system. Accordingly, on the other hand, the temperature of the intake air depressurized by the turbine drops. Thus, a direct relationship can be established between the rise or fall in temperature and the air flow rate delivered by the secondary air charging system. The measured temperature values can thus be analyzed with regard to the delivery rate of the secondary air charging system and thus enable it to be controlled and/or regulated in this way.

In accordance with one advantageous embodiment of this invention, the drop in temperature at the turbine and the increase in temperature at the compressor are measured simultaneously. This results in a temperature difference which is higher in absolute value than that obtained by measuring only one of these two values. Thus, more detailed information regarding the delivery rate of the secondary air charging system is possible.

It may also be advantageous to provide a temperature sensor upstream from the turbine and/or the compressor. In this way, the prevailing temperature difference at the compressor and/or the turbine can be determined at any point in time. This also makes it possible to improve the accuracy of the current measurement results. However, as explained in greater detail in conjunction with the methods of operating the secondary air charging system, such an additional temperature sensor is not absolutely necessary.

The invention additionally relates to a method of monitoring the secondary air injection into the exhaust system of an internal combustion engine. This is suitable in particular for use in the device described above for secondary air injection. This method has three different embodiments.

According to a first embodiment of this method, the heating of the secondary air, which is accomplished by compression of the secondary air, is measured, at least one temperature sensor being required on the side of the compressor outlet for this purpose. In the alternative embodiment, the temperature sensor is mounted on the outlet side of the turbine of the secondary air charging system, so that a drop in temperature of the expanded air is to be measured.

The process of secondary air injection takes place within the first 100 seconds of operation after a cold start of the engine. It is therefore possible to use the temperature sensors which are also used at the outlet side of the turbine or compressor for measurement of the reference signal, which yields the increase or decrease in temperature. During this short operating time of the secondary air charging system, it may be assumed that the temperature of the ambient air, i.e., the intake secondary air and/or intake air for the engine does not change significantly. Therefore, it is possible to omit the second sensor for determining a reference signal.

However, such a second sensor may be provided, so that a greater accuracy may be achieved in the measurement results. Furthermore, the method of monitoring the secondary air injection may also be used to obtain additional information with regard to the functioning of the secondary air charging system. In this case, the second temperature sensor may be suitable.

Conceivable information about the functioning of the secondary air charging system would be obtained by sensing a malfunction, for example. In the case of bearing damage in the secondary air charging system, for example, the achievable rotational speed would be reduced, so that the required delivery rate could no longer be achieved. This might be noticed, for example, due to a failure to achieve the expected temperature difference at the secondary air charging system, and this information could be relayed as an error signal to the engine control unit.

An alternative method using two sensors provides for one temperature sensor for the expanded intake air to be installed downstream from the turbine and one temperature sensor for the compressed secondary air to be installed downstream from the compressor. During operation of the secondary air charging system, the temperature downstream from the turbine will drop and the temperature downstream from the compressor will rise. The temperature difference achieved can be analyzed in this way. The absolute value of this difference is greater than the individual measured values of the two sensors, so the measurement result permits better resolution. In addition, the temperature difference measured in this way is essentially independent of the original temperature of the ambient air intake, because with a shift in the temperature of the ambient air, there is merely a parallel shift in the two measured values on the temperature axis.

Another embodiment of the measurement method includes the analysis of the change in the measurement results over time. The temperature gradient over time $\delta T/\delta t$ can be determined in this way. The advantage of such an analysis of measurement results is that during warm-up of the secondary air charging system, this value supplies results that can be analyzed at an earlier time in the measurement than does measurement of the temperature level ultimately reached.

In addition, it is a great advantage to use the measurement results for additional information about the functioning of the secondary air charging system. In this regard, the final temperature level reached can be used for the rate, and any temperature gradient determined can also be used. In this way, malfunctioning of the secondary air charging system, for example, can be detected. For example, wear on the charging system could result in the secondary air charging system no longer reaching the rated rotational speed. In such a case, the temperature level of the rated operating state would no longer be achieved, which could be indicated by a corresponding analyzer logic unit.

Additional information with regard to functioning of the secondary air charging system may be necessary, e.g., if it assumes additional functions in the cold start phase of the engine in addition to injection of secondary air. For example, the secondary air charging system may be used to supply fresh air for desulfating the exhaust gas catalytic converter into the exhaust line. Other required air flow rates can also be set here via the control unit.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
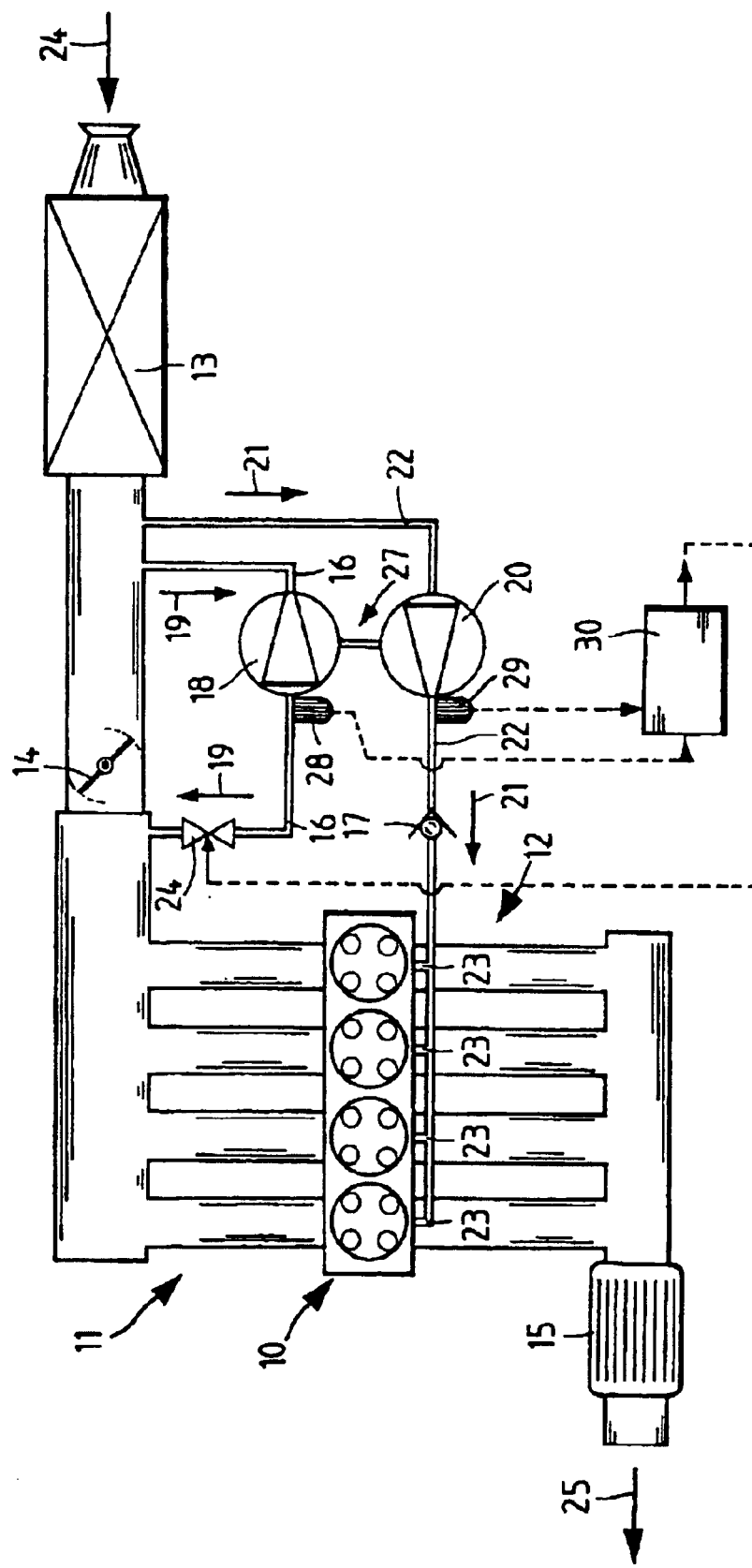
FIG. 1 is a block diagram of an internal combustion engine having a secondary air charging system driven by a turbine connected in parallel with the throttle valve.

FIG. 1 shows an embodiment which should require a minimal complexity of components. An internal combustion engine 10 is provided and is equipped with an intake tract 11 and an exhaust system 12. In the intake tract there is at least one air filter 13 and a throttle valve 14. The exhaust system is equipped with a catalytic converter 15. Downstream from the air filter 13 and upstream from the throttle valve 14, a bypass line 16 branches off and leads back to the intake tract 11 downstream from the throttle valve. A throttle member 24 is provided in the bypass line 16. In addition, a turbine 18 is provided in the bypass line 16, which turbine is driven by a bypass air stream 19. The turbine is mechanically connected to a compressor 20, which forces a secondary air stream 21 through a secondary air line 22 and thus forms a secondary air charging system 27. The secondary air line 22 opens into feed lines 23 of the exhaust system 12 upstream from the catalytic converter 15. A non-return valve 17 is provided in the secondary air line to prevent hot exhaust gas from flowing back through this line. Arrows along the lines indicate the directions of flow of an intake air stream 24, of the bypass air stream 19 and of the secondary air stream 21, as well as of the exhaust 25.

Figure 2:
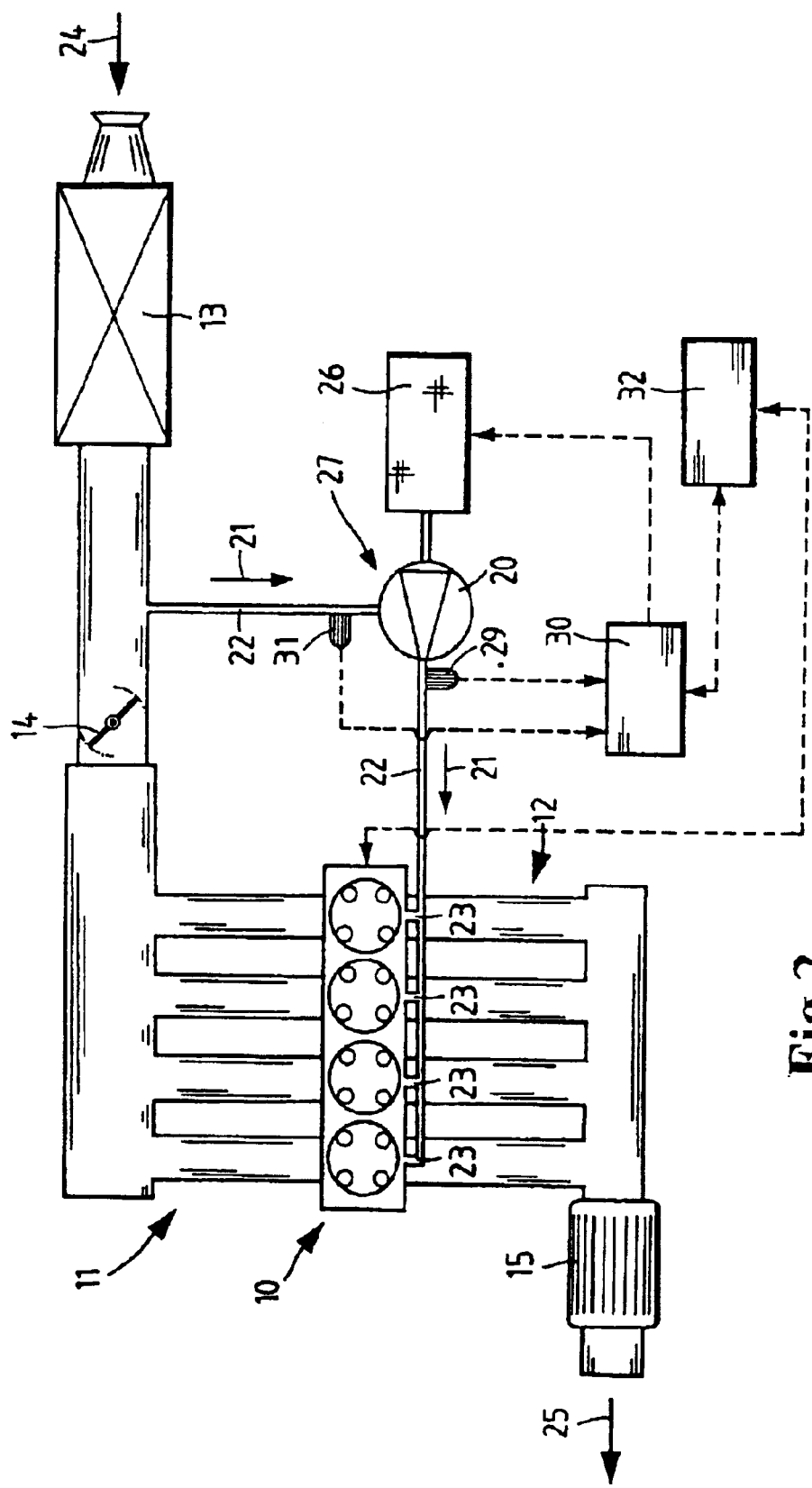
FIG. 2 shows an internal combustion engine having conventional secondary air injection, in which the compressor is driven by an electric motor.

The elements described so far are also included in the embodiment according to FIG. 2, except for the drive by the turbine, and will not be explained again here. Instead of the turbine, however, a conventional electric motor 26 is provided for driving the compressor 20.

In addition, FIGS. 1 and 2 show different measurement configurations for the temperature upstream and/or downstream from the turbine and the compressor which will be explained in greater detail below. Insofar as these measurement configurations do not relate to the turbine according to FIG. 1, they can also be used in the two systems illustrated in FIGS. 1 and 2, although they are described in conjunction with only one figure.

According to FIG. 1, a temperature sensor 28 is provided at the outlet of the turbine 18, and a temperature sensor 29 is provided at the outlet of the compressor 20. These temperature sensors communicate with a control unit 30, which evaluates the measurement signals. In this illustrative embodiment, a difference is formed between the two measured temperatures, so that the starting temperature prevailing at the compressor inlet and that at the turbine inlet can be disregarded. The control unit 30 exerts an influence on the throttle member 24 to permit adjustment of a corresponding secondary air stream as a function of the measurement results of the temperature sensors 28, 29. This makes use of the circumstance that the delivery rate of the compressor 20 depends on the air throughput through the turbine 18.

In the case of the measurement configuration according to FIG. 2, the temperature sensor 29 is also provided at the outlet of the compressor 20. In addition, another temperature sensor 31 is provided at the inlet of the compressor 20. These temperature sensors communicate with the control unit 30 as described above. This permits a direct comparison of the inlet temperature and the outlet temperature of the secondary air stream 21. This comparison is analyzed by the control unit 30, and the rotational speed of the electric motor 26 is adjusted to deliver the required secondary air flow. In addition, the control unit 30 communicates with an engine control unit 32, so that in this way additional data regarding the operating condition of the internal combustion engine can be analyzed. Furthermore, the data thus obtained regarding the secondary air flow can be analyzed by the engine control unit. The engine control unit communicates with the internal combustion engine in the manner indicated. Of course, the control unit 30 and the engine control unit 32 may also be combined in a single unit.

Figure 3:
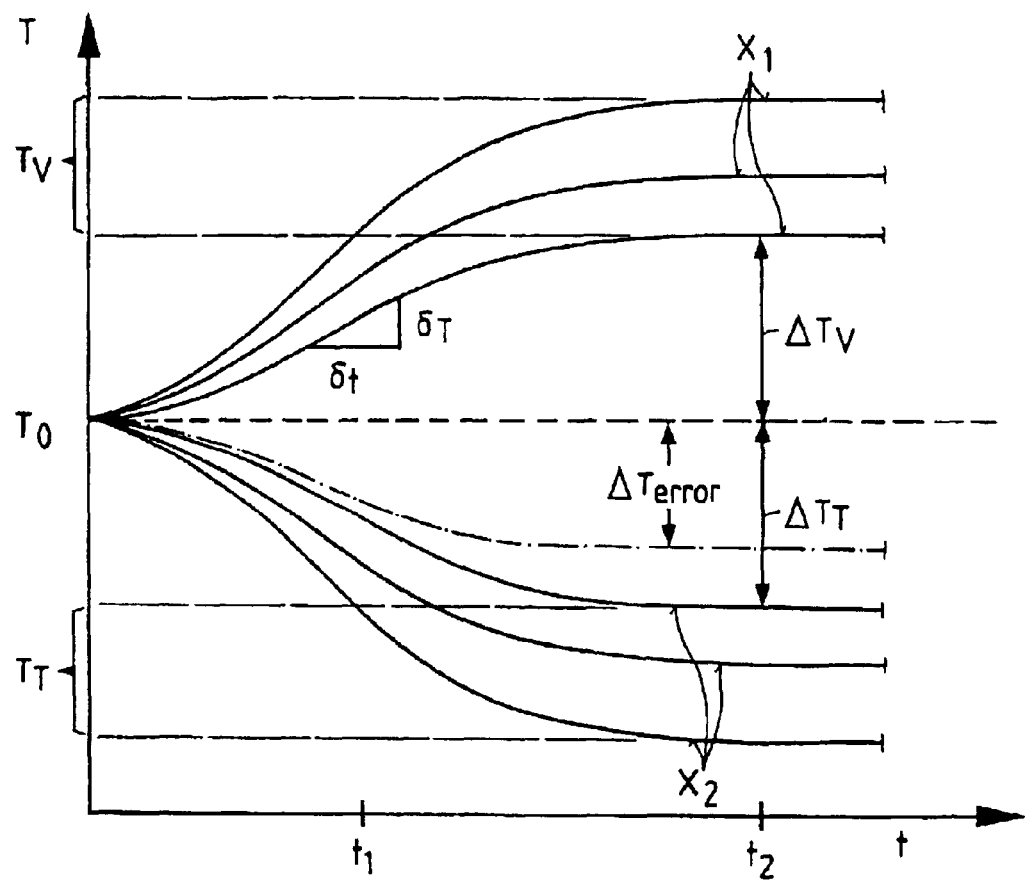
FIG. 3 depicts the temperature curve over time of a secondary air charging system comprising a compressor and a turbine.

FIG. 3 shows the temperature curve of the air output by a secondary air charging system driven by a turbine. The temperature curve of a secondary air charging system having a conventional drive corresponds to the top set of curves $X_1$, so that this diagram can also be used for that case. Starting at the ambient temperature $T_0$, heating takes place in the compressor due to the output of secondary air. The greater the output of air by the compressor, the greater the heating effect. This is indicated by the set of curves $X_1$. In this way, a temperature range $T_V$ in which the compressor is operated is indicated by the various defined operating states of the compressor.

A comparable temperature curve is obtained for the turbine, except that there is a reduction in the temperature $T_0$ only due to the depressurization of the intake air in the turbine. This results in the set of curves $X_2$ and a temperature range $T_T$ in which the turbine can be operated.

Since the secondary air charging system can be operated at various temperatures, the change in temperature must be determined in relation to $T_0$. This temperature is indicated by a dotted line, which in the normal case runs parallel to the time axis. A first possibility for the measurement is given at the time $t_2$. At this point in time, the turbine and the compressor have been warmed up, so that $\Delta T_V$ can be measured as the temperature level at the compressor. In the same way, $\Delta T_T$ can be measured with respect to the turbine. As an alternative, the temperature gradient $\delta T/\delta t$ can be measured at time $t_1$. This is indicated in the diagram only for the compressor. It can be seen that the gradient becomes steeper, the higher the temperature level ultimately reached. Therefore, a conclusion regarding the temperature level reached at some point in time can be obtained at an earlier point in time than $t_2$. Determining the temperature gradient here has the advantage that an analyzable result is available at an earlier point in time after the start of the secondary air charging system.

Finally, the diagram shows schematically a temperature indicated with a broken line leading to faulty operation of the secondary air charging system. This may occur, for example, in the case of bearing damage in the secondary air charging system. The temperature sensor detects a temperature value $\Delta T_{error}$ which results in output of an error signal in the control unit.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of monitoring the secondary air injection into an exhaust system of an internal combustion engine, wherein a delivery rate of secondary air delivered by a secondary air charging system is monitored, and the secondary air charging system is driven by a turbine arranged in parallel with a throttle valve in an intake tract of the internal combustion engine, said method comprising measuring cooling of intake air which occurs due to expansion in the turbine, and using the measurement result as a measure of the delivery rate of the secondary air charging system.

2. A method according to claim 1, wherein a change in the measurement results over time is determined and used as a measure of the delivery rate of the secondary air charging system.

3. A method according to claim 1, wherein the measurement results are used for additional information with regard to functioning of the secondary air charging system.

4. A method of monitoring secondary air injection into an exhaust system of an internal combustion engine wherein a delivery rate of secondary air delivered by a secondary air charging system is monitored, and the secondary air charging system is driven by a turbine arranged in parallel with a throttle valve in an intake tract of the internal combustion engine, said method comprising:

measuring the temperature of intake air downstream from the turbine;

measuring the temperature of secondary air downstream from the compressor; and using the measured temperature of intake air downstream from the turbine and the measured temperature of the secondary air downstream from the compressor as a measure of the delivery rate of the secondary air charging system.

5. A method according to claim 4, wherein a change in the measurement results over time is determined and used as a measure of the delivery rate of the secondary air charging system.

6. A method according to claim 5, wherein the measurement results are used for additional information with regard to functioning of the secondary air charging system.

7. An internal combustion engine having an intake tract for intake air and an exhaust system for combustion products of the internal combustion engine, and further comprising a secondary air charging system comprising a compressor powered by a drive, and a sensor for generating a measurement signal suitable for determining a delivery rate of secondary air delivered by the secondary air charging system, wherein said drive comprises a turbine, which is arranged in parallel with a throttle valve in the intake tract, and said sensor is a temperature sensor which communicates with depressurized intake air downstream from the turbine to measure the temperature of the depressurized air.

8. An internal combustion engine according to claim 7, further comprising a second temperature sensor which communicates with compressed air downstream from the compressor to measure the temperature of the compressed air.

9. An internal combustion engine according to claim 8, further comprising another temperature sensor which communicates with air upstream from the compressor to measure the temperature of the upstream air.

10. An internal combustion engine according to claim 7, further comprising another temperature sensor which communicates with air upstream from the turbine to measure the temperature of the upstream air.

* * * * *